Jan. 17, 1967  E. H. WILLETTS  3,298,710
TANDEM AXLE TORSIONAL SUSPENSION SYSTEM FOR VEHICLES
Filed June 1, 1964  6 Sheets-Sheet 1
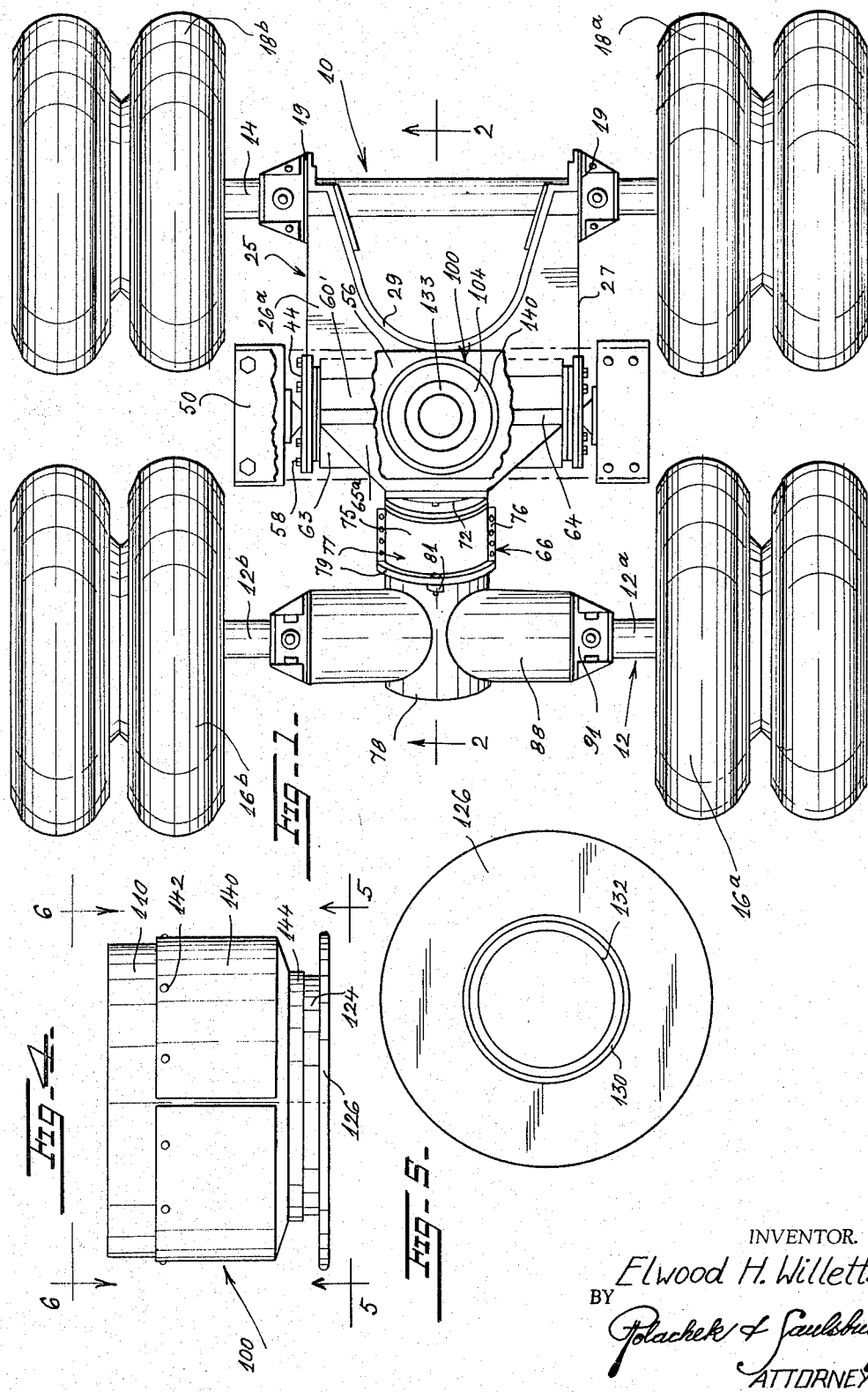
INVENTOR.
Elwood H. Willetts
BY
Polachek & Saulsbury
ATTORNEYS.

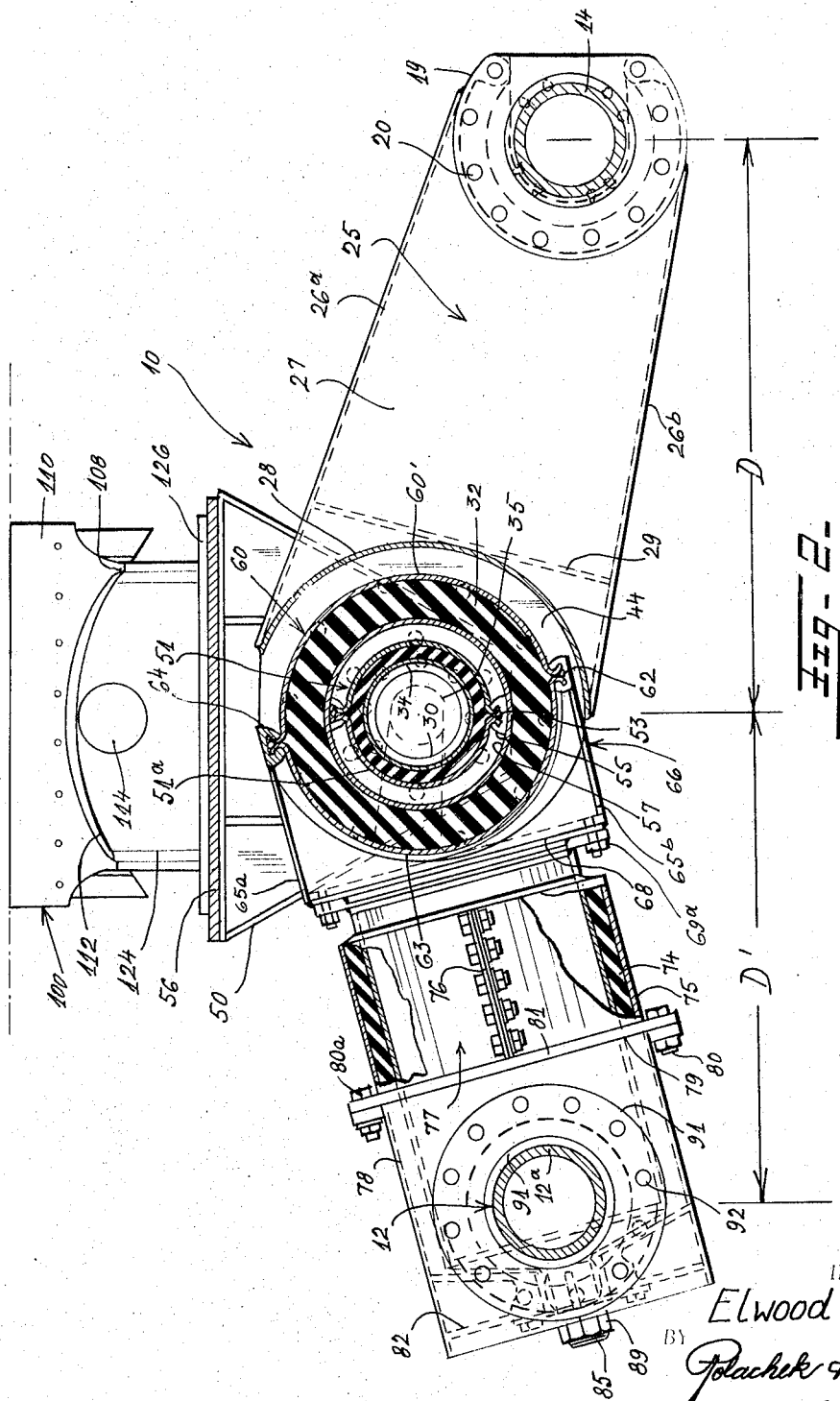

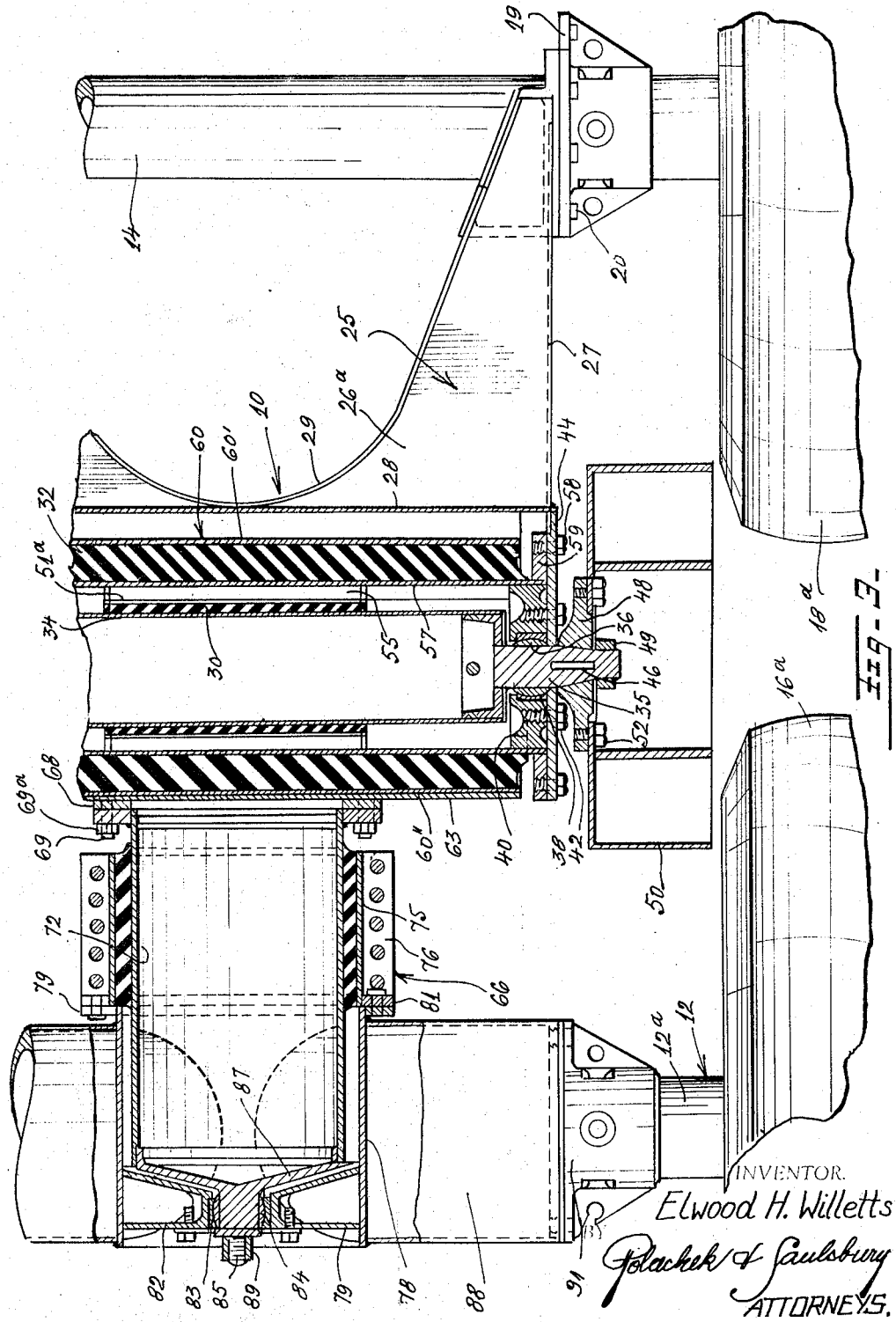

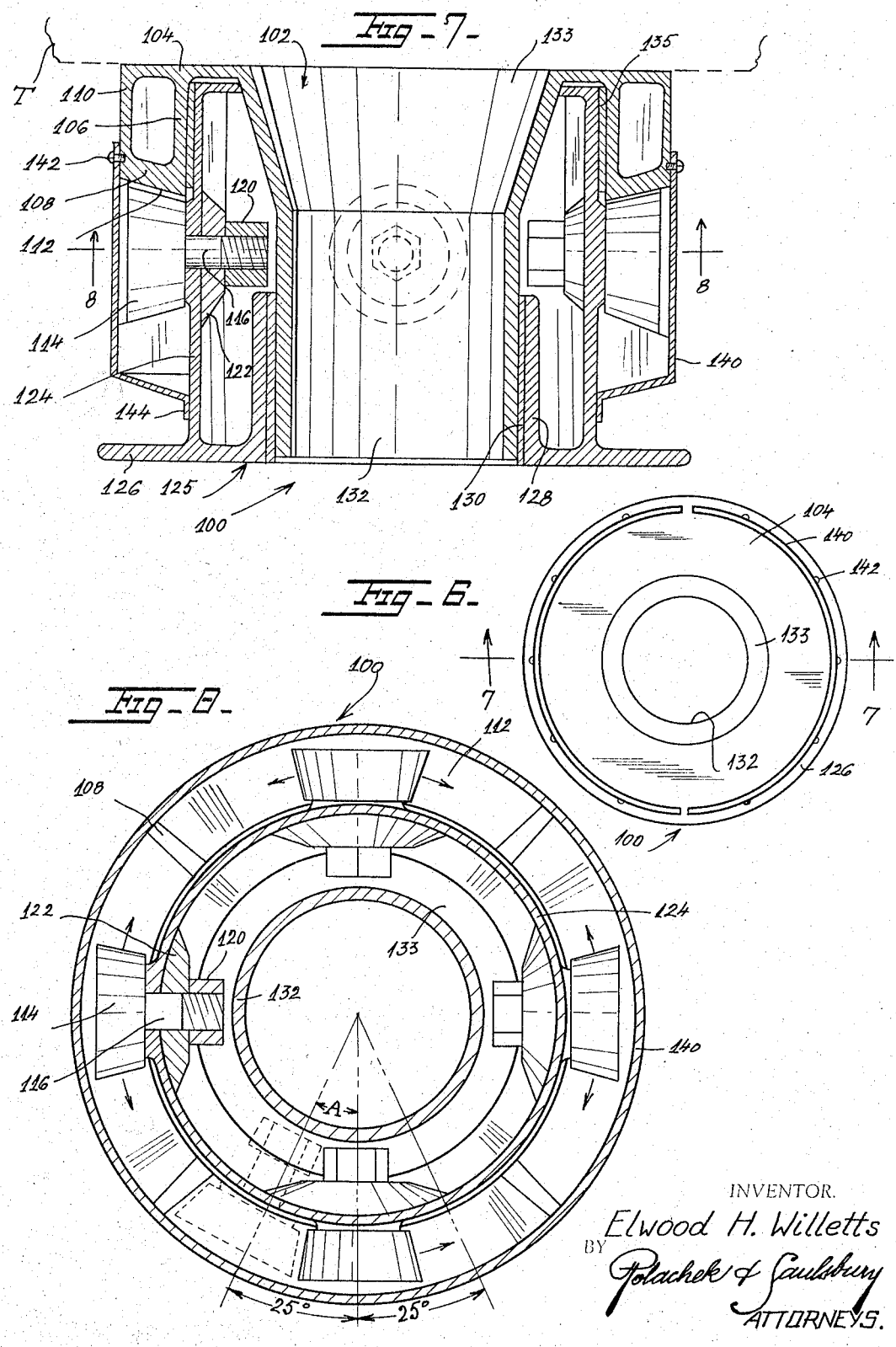

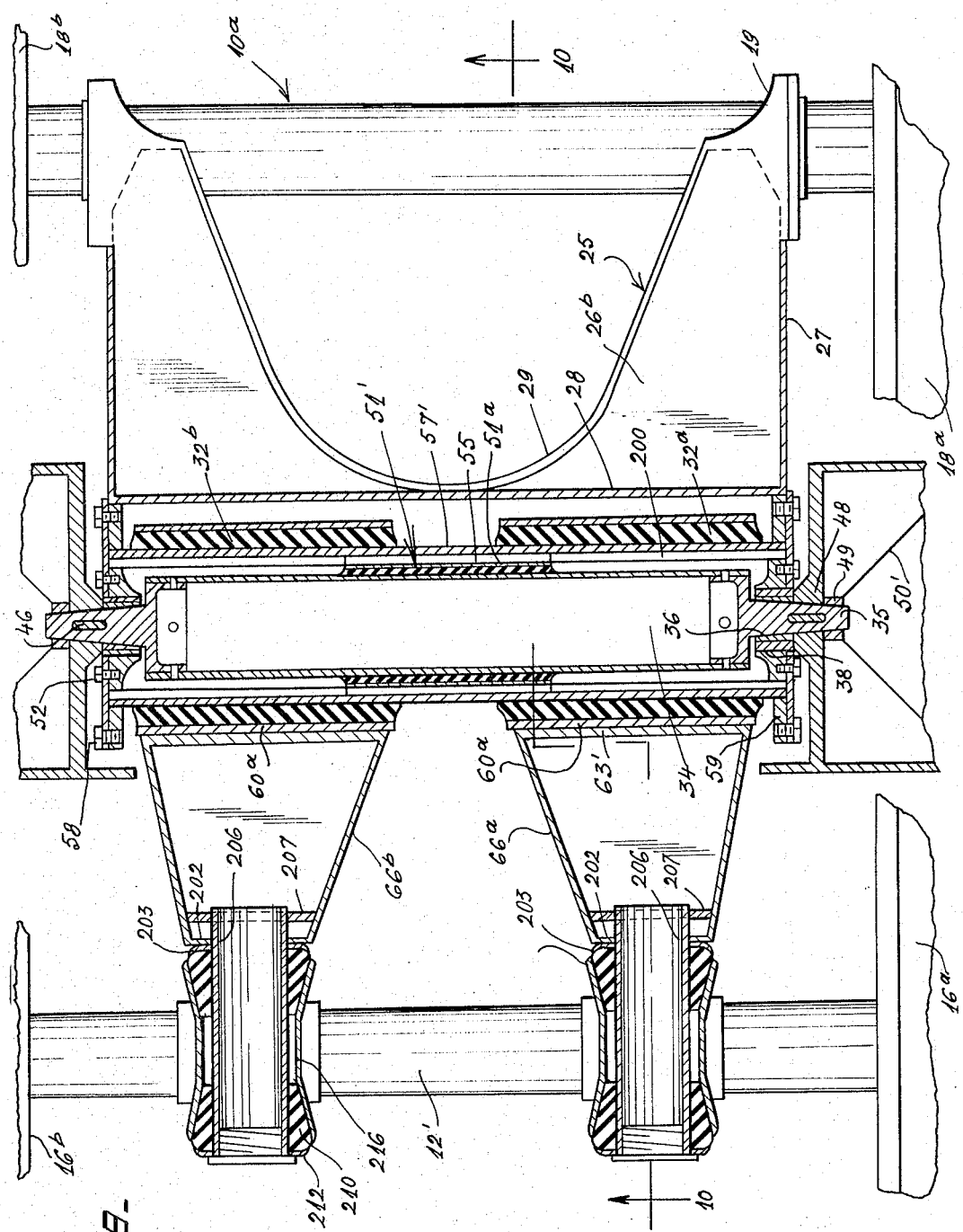

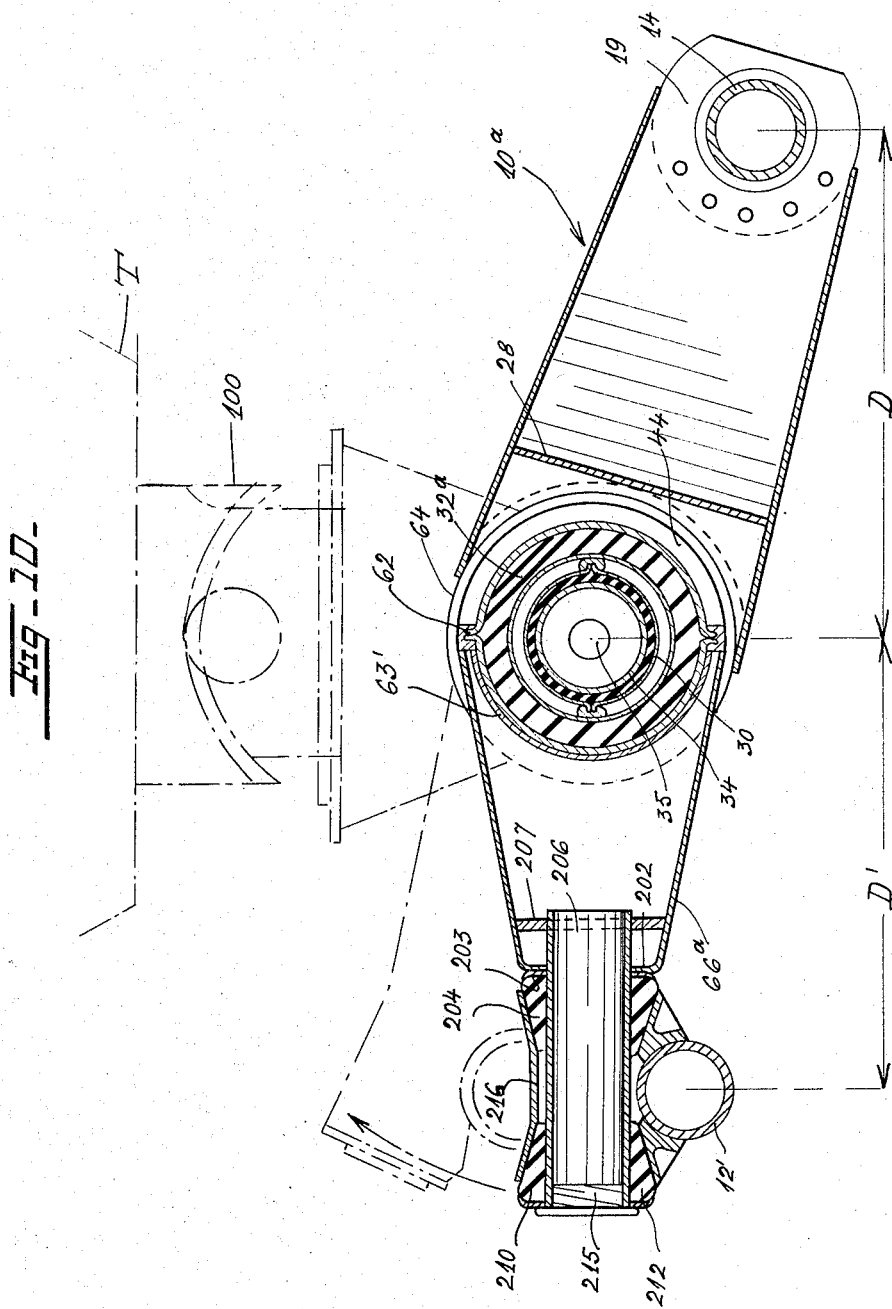

United States Patent Office 3,298,710
Patented Jan. 17, 1967

3,298,710
TANDEM AXLE TORSIONAL SUSPENSION SYSTEM FOR VEHICLES
Elwood H. Willetts, Douglaston, N.Y.
(102 S. Penataquit Ave., Bay Shore, N.Y. 11706)
Filed June 1, 1964, Ser. No. 371,669
5 Claims. (Cl. 280—104.5)

This invention relates to a tandem axle torsional suspension system for vehicles, and more particularly concerns a suspension system for tandem axle trailers and similar vehicles in which a load is resiliently supported through torsionally stressed elastomer or rubber bushings secured to opposing torque reactive suspension arms. A forward one of the arms is pivotally connected to a forward one of the axles by means of a torsionally stressed tubular elastomer bushing which controllable manner permits a wheel on one end of the axle to roll over a higher point than a wheel at an opposite end of the axle. A rearward one of the arms is engaged with a rearward axle to maintain parallel vertical movement of this axle with respect to the trailer body or supported vehicle structure to prevent transverse static roll of the vehicle structure.

It is a principal object of the invention to provide a suspension system for a trailer vehicle which may be turned sharply about the center of its tandem axle bogie, the suspension having nested elastomer bushings to allow vertical displacement of the suspension, while permitting cushioned freedom of vehicle movement in a vertical plane and while maintaining transverse stabilization of the vehicle.

Another object of the invention is to employ elastomer bushings stressed in torsional shear in a soft ride or low frequency tandem suspension for semi-trailers wherein the transverse shear forces of jack-knifing the vehicle from a position of rest will not exceed the durable tilt resistance of the elastomers, without the employment of track bars between the axles and vehicle structure.

Another important object of the invention is to provide a suspension system for forward and rearward axles in a trailer bogie, wherein there are forwardly and rearwardly extending suspension arms, and a pair of concentrically nested, axially aligned tubular elastomer bushings stressed in torsional shear and constituting springs, one of the bushings interconnecting a vehicle frame structure with the rearwardly extending arm, while the other bushing interconnects both suspension arms, the rearwardly extending arm being proportionally longer than the forwardly extending arm whereby torsional reaction at both axles is equalized.

A further object of the invention is to provide a tandem axle suspension system for a vehicle, wherein the vehicle's load at the ground is uniformly and equally distributed between each of the axles of the bogie, the rearward or trailing axle of the tandem being located further from the transverse axis support of the tandem than the forward axle, to provide trailing steering control of the bogie.

Still another object of the invention is to provide means for preventing transverse roll in a low vibration frequency suspension system employing nested elastomer bushings of low static shear modulus, said means involving a unified arrangement of a rearward axle and a cross shaft of the suspension system while affording controlled freedom of wheel stroke at each end of the forward axle of suspension system.

It is another object to provide means to enable application of a suspension system of the character described to one end of the vehicle structure, wherein automatic self-steering of the suspended trailing end of the vehicle structure is obtained.

A still further object is to provide a novel and improved external clamping means for securing the adjacent ends of split sleeves bonded to the outer surfaces of elastomer bushings, so that stress in the bushings at the adjacent ends of said sleeves is minimized.

Still another object is to provide a suspension system for a vehicle structure including brackets, a cross shaft between the brackets supported in bearings, a second shaft encircling the cross shaft and radially spaced therefrom, a first elastomer tubular bushing stressed in torsional shear interposed between, bonded to and interconnecting both shafts, annular flanges on the second shaft, a second elastomer bushing interconnecting the second shaft with a hub having a forwardly extending suspension arm, a hub surrounding the forward suspension arm, transversely extending wheel spindles axially centered on the hub, the arm and hub being interconnected by ball bushings and a third elastomer tubular bushing stressed in torsional shear, and another suspension arm extending rearwardly from the flanges to a wheel supported axle.

A further object is to provide a suspension system as described, wherein the bushings are bonded at their outer surfaces to metallic semicylindrical sleeves having opposing edges curled outwardly and clamped together by channel-shaped clamps extending radially outward of the sleeves and bushings.

A still further object is to provide a suspension system as described, wherein a load controlled resistance between the vehicle structure and the suspension brackets permits limited arcuate oscillation of the bogie about a vertical plane to enable self-steering of the end of the vehicle supported by the bogie.

In an alternate arrangement of the invention, which accomplishes the same objectives as aforesaid, the opposite ends of the forwardly disposed axle are enabled to vertically move independently and oppositely by attaching each of its suspension arms to adjacently separate elastomer bushings bonded to a single hollow shaft, the reactions of the elastomers supporting the rearwardly disposed axle in vertical parallelism with the vehicle structure by journalling said hollow shaft in brackets attached to said structure. The swivelable turret is applicable to either form of the invention.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top plan view of a bogie including a suspension system embodying the invention.

FIG. 2 is an enlarged sectional view, taken on line 2—2 of FIG. 1, parts being shown in side elevation.

FIG. 3 is an enlarged fragmentary horizontal sectional view of the suspension system of FIG. 1.

FIG. 4 is a side elevational view of a turret assembly for connecting a bogie to a trailer.

FIG. 5 is a bottom plan view of the turret assembly of FIG. 4.

FIG. 6 is a top plan view of the turret assembly.

FIG. 7 is an enlarged vertical sectional view taken on line 7—7 of FIG. 6.

FIG. 8 is a horizontal sectional view taken on line 8—8 of FIG. 7.

FIG. 9 is a fragmentary sectional view similar to FIG. 3 of another form of the invention.

FIG. 10 is a sectional view similar to FIG. 2, of the form of the invention of FIG. 9.

In my prior United States Patents 2,951,710 and 3,013,-808, I described axle suspension systems for trailer bogies employing nested elastomer bushings stressed in torsional shear and constituting tubular spring mountings, separate for each side of a vehicle. The outer of the nested bushings was attached to a longitudinally extending suspension arm. The torsional reaction of the spring mounting was taken by an opposing arm attached to both inner and outer nested bushings while the reaction of the inner bushing was transferred to respective sides of the bogie frame structure.

In the present invention uniform reactions at the ground are desired at the tires through both axles of the bogie. The suspension arms to both leading and trailing axles are connected off the axis of the nested bushings. The trailing arm is longer than the leading arm in proportion to the torsional force of the inner of the nested elastomer bushings which is anchored to the vehicle structure and reacts only on the trailing axle to equalize the load reaction of both axles at ground.

An increased length of the trailing arm, over the leading arm, is to provide a steering control over the bogie where a self-steering action is desired. For practical applications, the increased length of the trailing arm may be only a fraction of the length of the forward arm. Thus the inner bushing connected to the bogie frame is less able to resist a tilt load or force imposed on such a structure as installed in a conventional semitrailer, when the tractor drawing the trailer moves the rear end of the trailer at right angles to the normal tire path of its rear suspension. This is overcome in the present invention by bonding the inner of the two nested tubular bushings to a shaft supported at its opposite ends in ball bushings which also support the encircling shaft for the outer tubular bushing. The ball bushings take both radial and end thrust loads from the longer rear arm, thus relieving the smaller, less resistant inner elastomer bushing of the aforementioned tilt load. The ball bushings further relieve the smaller inner bushing of the total radial and thrust loads. This arrangement of nested tubular elastomer bushings stressed in torsional shear bonded to nested shafts carried on ball bushings enables the longer arm attached to the rearward axle to maintain alignment of the rearward axle and the suspension supporting brackets, whether they are attached to the body structure or to a turret where self-steering is desired. Neither track bars nor supplemental sway bars as conventionally required, are needed in the present invention to preserve running alignment of the rearward axle, and of vertical parallelism of the body structure with said rearward axle.

The high ratio of bushing length to shaft diameter provides adequate tilt capacity of the larger, outer elastomer bushing to withstand the forces of jackknifing imposed by the forward axle as the vehicle is moved about the vertical axis of its suspension bogie.

The forward suspension arm is provided with a longitudinal elastomer bushing to enable controlled transverse vertical oscillation of the forward axle so as to progressively increase resistance at either end of the axle to rising above like ends of the rearward axle, which remains parallel to the trailer body structure. Following is an example of the benefit obtained. For a bogie with four wheels rated at 36,000 pounds gross weight, with 18,000 pounds per axle and 9000 pounds per wheel, the torsional resistance of the forward axle's longitudinal bushing may be 1250 pounds per inch at the tire track; thus a rise of seven inches at the right forward wheel would be resisted by 7×1250=8750 pounds in addition to the 9000 static load, or 17,750 pounds of the 18,000 pounds total static load on the right side of the bogie.

In the present invention a novel means of clamping the abutting ends of the metallic split sleeves bonded outwardly of the elastomer bushings is provided to avoid increased stress in said elastomers thereat. Instead of projecting a key between the ends of bonded split sleeves and therebeyond into the elastomer a slight distance to avoid the key being overrun by the sleeve ends in resisting the torsional stress of the elastomer, the novel means employed here is to extend the abutting ends of the split sleeves radially outwardly in opposite circumferential directions and provide a coinciding longitudinal recess in an extruded steel key bar into which adjacent ends of the abutting sleeves will be clamped as said bonded sleeves are axially pressed into said key bar, which may in turn be attached to a suspension arm to which torsional stress is to be applied. The elastomer at such radially outwardly extending sleeve ends is likewise extended in bonded relationship beyond its nominal diameter to the intersection of the radially extending sleeves, thereby avoiding a stress concentration thereat.

In the present invention, arcuate movement under restraint between the trailer and its supporting bogie along the normal fixed steering path is permitted so that the rate of change from and to normal steering alignment is lessened. Tire side-slip is reduced and the bogie tends to follow the path of the towing tractor more readily. To control this delayed realignment of the bogie with the tractor, the trailing axle of the bogie is spaced from the axis of the pivot or turret connecting the bogie and trailer a distance taken longitudinally of the bogie and trailer, which distance is further than the distance of the leading axle of the bogie from the axis of the pivot. Meanwhile the load reaction at ground is equal at both axles of the bogie.

Uniform control of the movement under restraint between the trailer and bogie is obtained by a novel turret structure or assembly employing cam rollers carried by one pivotable frame part of the turret structure. These rollers contact helical cam faces formed on portions of another frame part of the turret structure. The frame parts are aligned by cylindrical bushings which keep the turret parts in axial alignment as the trailer body is raised and lowered, in turning from and to the straight steering path. The bushings take up horizontal shear forces, transverse roll forces, suspension torque reactions from the inner elastomer bushing connected to the rearward axle, and any imbalance resulting from unequal cam roller contacts.

The invention will be better understood from the following detailed description with particular reference to the drawings. Referring first to FIGS. 1–3, there is shown a bogie 10 for supporting one end of a vehicle structure such as a trailer body. The bogie includes a transverse forward tubular axle 12 having two sections 12a, 12b, and a rearward transverse tubular axle 14. The forward direction of travel of the bogie is taken from right to left as viewed in the drawings. At opposite ends of the forward axle are dual wheels 16a, 16b and at opposite ends of the rearward axle are dual wheels 18a, 18b.

Secured to the rearward axle 14 are horizontally spaced annular flanges 19. Attached to flanges 19 by bolts 20 are rear ends of a suspension arm 25. This arm is generally U-shaped in plan view as clearly shown in FIGS. 1 and 3. The arm includes upper and lower plates 26a, 26b and lateral plates 27 welded at the forward end of the arm to upper and lower edges of a cylindrically curved flange 28. A U-shaped brace plate 29 is welded at the center of its bight to the center of the arcuate flange 28.

The suspension system of the bogie includes first and second concentric, elastomer bushings 30 and 32. Bushing 30 is axially shorter and centrally located within the second longer bushing 32. The cylindrical bushing 30 is radially thinner than outer bushing 32. Both bushings are elastomeric and serve as coacting tubular springs in the suspension system.

Permanently bonded to the inner surface of the first bushing is a cylindrical cross shaft 34. This shaft terminates in axial spindles 35 to which are secured in spherically curved, ball-like bushings 36 seated in angularly rotatable bearing blocks 38. The bearing blocks are engaged in spacer plates 40. Plates 40 are attached by bolts 42 to flanges 44 welded to the inner side of arcuate plate 28 to which arm 25 is attached. By this arrangement the rearward suspension arm 25 supports the inner bushing 30 and bearings 36. The shaft 34 is nonrotatable and is keyed by keys 46 at opposite ends to end flanges 48 on spindles 35. Nuts 49 on the ends of spindles 35 holds the flanges 48. Brackets 50 which are generally triangular in vertical section are secured by bolts 52 to flanges 48. A turret structure or assembly 100 is secured on a platform plate 56 attached to brackets 50. This turret structure rotatably connects the bogie to a trailer body as is explained below in connection with FIGS. 4–8.

On the outer surface of bushing 30 is a cylindrical split sleeve 51 formed by two semicylindrical plates 51a. The circumferential edges 53 of these plates are abutted to each other. The edges of the plates are curved or curled radially outwardly and circumferentially away from each other to define flanges which are clamped together by channel-shaped locking clamps 55. These clamps are welded at diametrically opposed positions to the inner surface of a second shaft 57.

Bonded to shaft 57 is the second tubular elastomer bushing 32. The second shaft extends axially beyond bushing 32. Annular flanges 59 are welded to opposite ends of the shaft 57 and bolts 58 attach flanges 59 to flanges 44. By this arrangement the second bushing 32 is connected to the rearward suspension arm 25. Attached to the outer surface of bushing 32 is a cylindrical split sleeve 60 defined by two semicylindrical plates 60', 60''. Circumferential edges 62 of these plates are abutted like the edges of plates 51a. The edges 62 are curved or curled outwardly in opposite directions and are clamped together by channel-shaped locking clamps 64. These clamps are disposed in diametrically opposed positions with respect to bushing 32 and are displaced angularly with respect to clamps 55 in a counterclockwise direction as shown in FIG. 2. Attached by welding to clamps 64 is a hub 63. Attached to this hub 63 are rearward edges of plates 65a, 65b forming parts of a forward suspension arm 66 of the bogie. By this arrangement the forward arm 66 is tiltably engaged on the outer side of bushing 32 while rearward arm 25 is tiltably engaged on the inner side of the bushing. Bushing 32 serves as a tubular spring between the arms 25 and 66. Furthermore, since the second shaft 57 is secured via clamps 64 to the outer side of bushing 30, the rearward arm 25 is tiltably supported with respect to inner shaft 34 nonrotatably connected to the vehicle structure via turret structure 100.

The curled edges of the split sleeves of the inner and outer bushings are press fitted endwise into the channel-shaped clamps which have slightly tapered interiors to receive the edges of the sleeves. The split sleeves are bonded to the outer surfaces of the inner and outer bushings. The clamps compress the rubber of the bushings to offset shrinkage stress in the rubber which may result from elevated temperatures employed to effect bonding of the rubber or elastomer to the sleeves.

The forward suspension arm plates 66a, 66b have forward edges welded to an annular flange 68 which in turn is attached by bolts 69 and nuts 69a to an annular flange 70 at the rear end of a cylindrical shaft 72. Shaft 72 is bonded to the inner surface of a third elastomer bushing 74. Bushing 74 extends axially longitudinally of the bogie. This bushing serves to resist vertical travel of wheels 16a, 16b on opposite ends of forward axle 12.

Semicylindrical plates 75 defining a split sleeve 77 are secured by bolts on flanges 76 to the outer surface of bushing 74. A cylindrical arm hub 78 is welded to an annular flange 79 which is secured by bolts 80 and nuts 80a to a flange 81 on forward ends of the plates 75. At the forward end of this hub is an end flange structure 82 carrying a bearing block 83. A ball bushing or bearing 84 is seated in block 83. The bearing 84 is held rotatably to a spindle 85 axially mounted on a flange 87 at the forward end of shaft 72 which is bonded to the inner side of third bushing 74. Transversely extending wheel spindles 88 are secured to outer sides of the arm hub 78. Forward axle 12 has two sections 12a, 12b which extend axially to the wheel spindles and are attached thereto by flanges 91 and bolts 92. A nut 89 is screwed on the end of spindle 85 and bears on the forward end of bearing 84. The bearing is turnable slightly in the bearing seat or block 83. By this arrangement the inner shaft 72 is connected by an elastomer spring to the arm hub 78, wheel spindles 88 and forward axle 12.

It will be noted that the distance D which is the length of rearward suspension arm 25 as indicated in FIG. 2, is somewhat longer than the distance D' which is the effective length of forward suspension arm 66. As previously indicated, this increased length of arm is offset by the torsional reaction of the inner elastomer bushing to provide equal load reactions at both axles. The suspension arms are angularly disposed to each other as best shown in FIG. 2, with the arms arranged so that the longer rearward arm provides a trailing steering control over the forward axle. The ball bushings or bearings 36 take up radial and end thrust loads from the rearward arm 25 and relieve the inner elastomer bushing of such loads.

FIGS. 1, 2 and 4–8 show a turret structure 100 which serves as a pivot connection between the bogie 10 and trailer body T. This structure has a frame 102 provided with an upper annular plate 104 which is secured to the trailer body T indicated by dotted lines in FIGS. 2 and 7. An inner cylindrical wall 106 is integral with plate 104 and with radially extending webs 108 integrally joined to outer cylindrical wall 110 of the frame. The webs 108 have helically curved bottom edges 112 which serve as cam faces. Against these cam faces are abutted frusto-conical cam rollers 114 rotatably carried on stub shafts 116. The shafts have threaded ends on which are engaged nuts 120. The cam shafts are supported in bosses 122 extending inwardly of a cylindrical wall 124 of another frame 125. The rollers extend radially outward of wall 124. Integral with wall 124 is a flat annular flange 126 which may be secured to platform 56 on the upper flat sides of brackets 50. Another cylindrical wall 128 is concentric and integral with wall 124 and is radially spaced inwardly thereof. Secured to the inner surface of wall 128 is a cylindrical bushing 130. Coaxial with the bushing is a cylindrical wall 132 forming part of frame 102. This wall has an upper flaring portion 133 which is integral with the inner edge of flange plate 104. Another cylindrical bushing 135 is interposed between wall 106 of frame 102 and wall 124 of frame 125. The bushing is secured to wall 124. The frames 102 and 125 are thus rotatably interfitted but with the relative rotation limited to an angle of about twenty-five degrees as indicated by angle A in FIG. 8.

Uniform restrained control of the arcuate movement between the trailer body and bogie is provided by this arrangement of the turret structure. The cam rollers 114 pivot on contact with the declining portions of the cam faces 112. Thus, increased loading of the trailer results in greater resistance against deviation from the straight path of travel, to balance the increased scuff resistance of the higher loaded tires, and increased assistance in returning thereto. The interfitting, mating frame parts of the turret structure are held coaxially aligned by bushings 130 and 135 as the trailer body T is raised or lowered in turning from and to a straight steering path.

While conical cam rollers are shown here in contact with the helical cam faces, it will be understood that it is possible to provide cylindrical cam rollers or non-rotatable cam members in place of rollers to contact the cam faces, if the increase in friction and less sensitivity in response resulting is tolerable.

The bushings 130 and 135 should be massive enough to relieve the cam faces and rollers of all forces except the vertical loads and resultant torsional forces. The bushings will take up the brake-horizontal shear force, the transverse roll force, the suspension torque reaction from the inner elastomer bushing 30 connected to the rearward axle 14, and any imbalance resulting from unequal cam roller contact.

The two frame parts of the turret structure are readily separable by lifting upper frame part 102 axially off of frame part 125. Semi-cylindrical dirt and dust shields 140 may be attached to the outside of wall 110 by screws 142. The shields have lower annular flanges 144 which slidably contact the outer side of frame wall 124.

In FIGS. 9 and 10 is shown another form of the invention, bogie 10a, which is generally similar to bogie 10, and corresponding parts are indentically numbered. In bogie 10a the inner elastomer bushing 30 is centered on its cross shaft 34 as in bogie 10. The outer bushing 32 is replaced by two axially aligned bushings 32a, 32b each of which is bonded around the common shaft 57'. This shaft has diametrically opposed keyway grooves 200 formed therein to receive the clamps 55 engaging the sleeve sections 51a of sleeve 51 disposed internally thereof. Separate forwardly extending tapered arms 66a, 66b are provided. They are connected to hub 63' secured to sleeves 60a bonded to the respective outer elastomer bushings 32a, 32b. Each of the tapered arms 65a, 65b has an annular end flange 202 closing the ends of arms 65a, 65b through which hollow shaft 206 extends both ways, being further secured in the arms by anchorage plates shown at 207. This shaft extends axially longitudinally of each of the forward arms, and is provided with an internal thread at its free end, into which threaded cap 215 is adjustably secured to deform tapered opposing rubber bushings 204, 210 between cupped washers 203, 212 to confine shaft 206 in axle bracket 216. Between the bushing 204 and 210, and detached from shaft 206, is an axle bracket 216 which is welded to forward axle 12'. Wheels 16a, 16b are mounted at opposite ends of this axle. Twisting movements of axle 12' are resisted by arms 66a, 66b through restrained rubber bushings 204, 210.

The bogie 10a operates like bogie 10 to effect independent and opposite vertical movement of opposite ends of the forward axle relative to the rearward axle. Self-steering control may be effected by a turret structure 100 supported by brackets 50' at opposite ends of spindles 35.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a torque reactive tandem axle suspension bogie for a vehicle structure, including first and second concentric elastomer bushings stressed in torsional shear and bondedly interconnecting first and second external split sleeves around the bushings for transfer of stress in supporting the vehicle structure, a plurality of brackets for connecting the bogie to a vehicle structure, the first of said bonded shafts journalled at transversely opposite ends in said brackets, the second of said bonded shafts being hollow and encircling said first shaft and journalled in radially spaced relationship thereto, means connecting said first bushing split sleeve to said second shaft, flanges on opposite ends of said second shaft, a third elastomer bushing shaft extending forwardly at right angles and connected to the split sleeves of said second bushing, a hub attached forwardly of and to the split sleeve of said third bushing shaft, the forwardly extending ends of said third bushing shaft and said hub journalled in coaxial alignment, an axle secured across and at right angles to said hub, a suspension arm extending oppositely to said third bushing shaft and interconnecting the flanges of said second shaft to another axle, whereby the ends of said latter axle may move vertically while like ends of said other axle are restrained in vertical movement to parallelism with the body structure.

2. The combination as defined in claim 1 and an attachment means for elastomer bushings stressed in torsional shear to avoid stress concentrations at adjacent ends of abutting split sleeves bonded externally of said elastomer bushings, the combination of a torsion shaft, a pair of encircling semi-cylindrical metallic sleeves having radially opposite ends extending outwardly, a tubular elastomer bushing bondedly interconnecting said shaft and the opposing surfaces of said pair of sleeves, a torsion transfer hub of lesser internal diameter than the free outer diameter of said bonded sleeves and provided with internal matching keyways for pressurized axial assembly of bonded sleeves therein.

3. The combination as defined in claim 1, wherein the external split sleeves of said elastomer tubular bushings each comprising a pair of semicylindrical plates having abutting edges curled radially outwardly and in opposite circumferential directions, said sleeve parts being clamped together to radially compress the elastomer bushing bonded within by being pressed axially into external keyways having female contour to accommodate and restrain said abutting edges curled radially outwardly, said external keyways outwardly securable to adjacent torque transferring elements of a suspension system.

4. The combination as defined in claim 3, and a turret structure located between said vehicle structure and said brackets, said turret structure having means to provide load controlled resistance to limited angular movement of said bogie relative to longitudinal alignment with the vehicle structure, whereby said bogie may automatically self steer a path of travel substantially duplicating changes in directional movement of the forward end of the vehicle.

5. In a torque reactive tandem axle suspension bogie for a vehicle structure, a frame, a shaft supporting said frame, brackets interconnecting said frame structure and said shaft, a split sleeve radially surrounding said shaft, tubular elastomer bushings stressed in torsional shear bondedly interconnecting said shaft and sleeve, a hollow shaft surrounding said split sleeve, bolted flanges on opposite ends of said hollow shaft, means for attaching said split sleeve to said hollow shaft, a second split sleeve surrounding said hollow shaft, a second tubular elastomer bushing stressed in torsional shear and bondedly interconnecting said hollow shaft and said second split sleeve, a hub extending forwardly at right angles to and connected to said second split sleeve, an axle disposed longitudinally of said first-named shaft, a third split sleeve attached at right angles to said axle, a third tubular elastomer bushing stressed in torsional shear and bondedly interconnecting said hub and said third split sleeve of said axle, a second axle disposed longitudinally opposite said first-named shaft from said first axle, and a suspension arm interconnecting the flanges of said hollow shaft and said second axle.

References Cited by the Examiner

UNITED STATES PATENTS

| | | | |
|---|---|---|---|
| 2,017,001 | 10/1935 | Hocking | 280—104.5 |
| 2,150,604 | 3/1939 | Hyatt | 280—104.5 |
| 2,673,746 | 3/1954 | Thompson | 280—125 |
| 2,951,710 | 9/1960 | Willetts | 280—104.5 |

BENJAMIN HERSH, *Primary Examiner.*

P. GOODMAN, *Assistant Examiner.*